United States Patent [19]

Lees

[11] Patent Number: 5,424,910
[45] Date of Patent: Jun. 13, 1995

[54] LEVER ASSEMBLY FOR A CONTROL DEVICE

[75] Inventor: Gerald E. Lees, Westminster, S.C.

[73] Assignee: Square D Company, Palatine, Ill.

[21] Appl. No.: 81,496

[22] Filed: Jun. 22, 1993

[51] Int. Cl.6 ............................................ H02B 11/14
[52] U.S. Cl. ...................................... 361/615; 74/524; 200/51 R; 361/727; 439/157
[58] Field of Search ......................... 74/519, 523, 524; 200/50 R, 50 B, 51 R; 439/157, 152, 153, 372; 361/605, 608, 609, 615, 724–727, 754, 759, 829, 832

[56] References Cited

U.S. PATENT DOCUMENTS

| | | | |
|---|---|---|---|
| 2,609,268 | 9/1952 | Nye | 312/320 |
| 4,301,494 | 11/1981 | Jordan | 361/415 |
| 5,006,951 | 4/1991 | Albert | 361/220 |
| 5,162,979 | 11/1992 | Anzelone et al. | 361/415 |
| 5,269,698 | 12/1993 | Singer | 439/157 |
| 5,309,325 | 5/1994 | Dreher | 361/754 |
| 5,325,263 | 6/1994 | Singer | 361/683 |

*Primary Examiner*—Gerald P. Tolin
*Attorney, Agent, or Firm*—Larry I. Golden; Kareem M. Irfan

[57] ABSTRACT

The present invention provides a lever assembly for reversibly inserting a control device into a cell of a center for controlling electrical service. The center has electrical terminals and a post extending perpendicularly into the cell and the control device has a frame of cross-members. The assembly includes a left hand lever, a right hand lever, and a fastener adapted to secure the levers to one of the cross-members and position the levers to engage the post as the device is inserted into the cell. Each lever includes a pivot hole positioned towards one end of the lever. The pivot holes receive the fastener and allow rotation of each lever about the fastener. Each lever also includes an open-ended slot to engage the post in the control center. Each lever also includes means for manually rotating the lever about the pivot hole. The rotating means connects to the end of each lever opposite the open end of the slot.

16 Claims, 2 Drawing Sheets

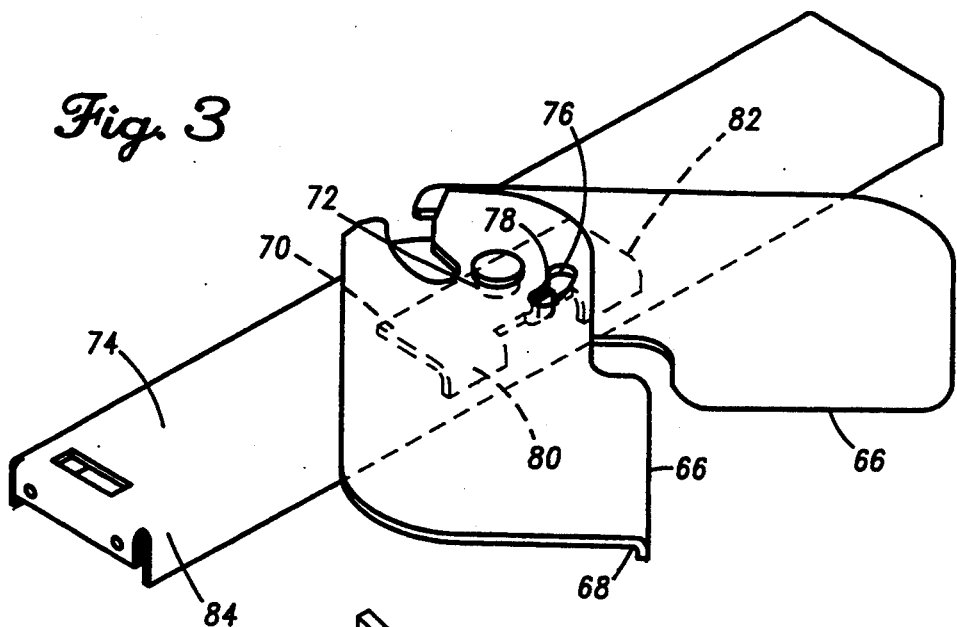
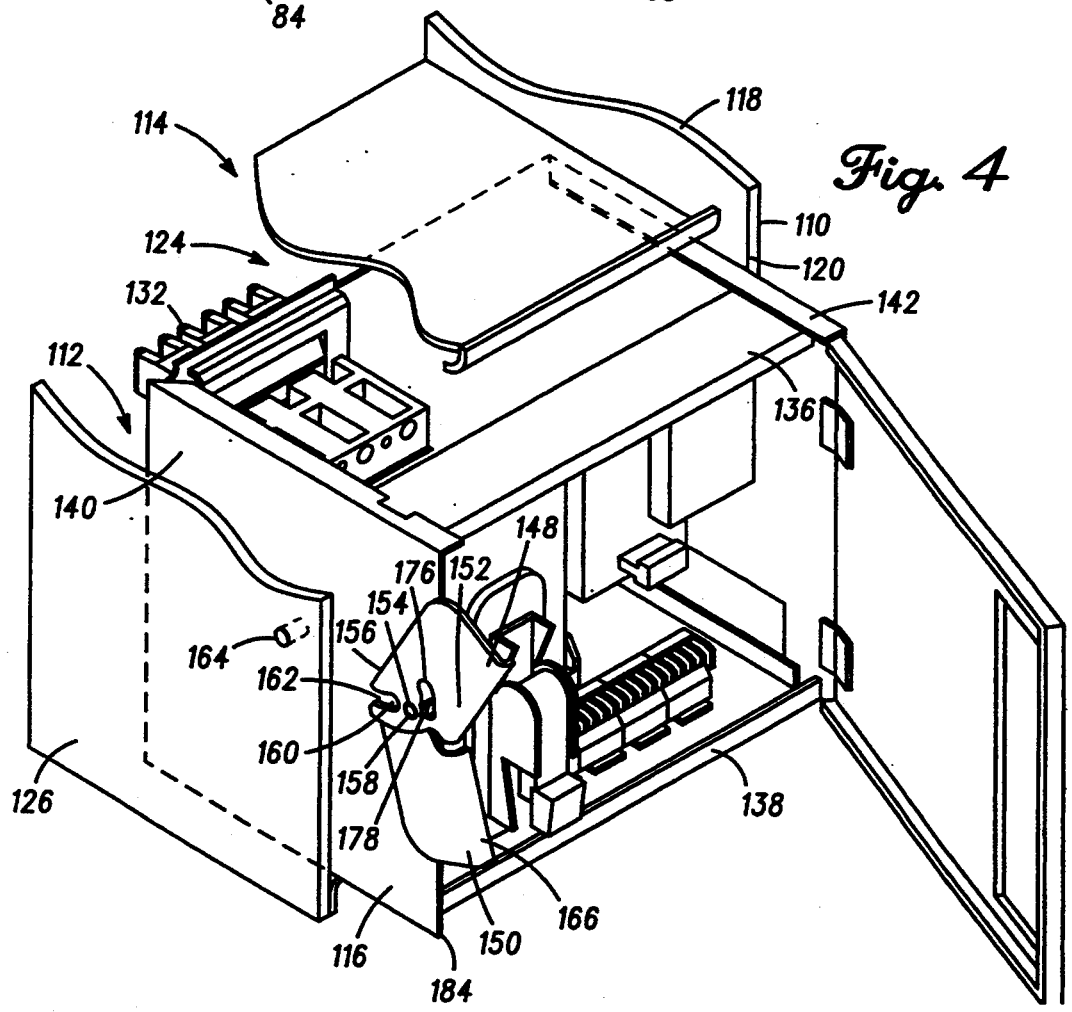

LEVER ASSEMBLY FOR A CONTROL DEVICE

FIELD OF THE INVENTION

The present invention relates to control centers for distributing and controlling electrical service which have electrical terminals for connection to individual control devices and, more particularly, to a lever assembly which reversibly provides mechanical engagement of the control center and control device terminals for electrical connection therebetween.

BACKGROUND OF THE INVENTION

Motor control centers, as well as other electrical equipment like switchgear, are equipped with draw-out type protective control devices such as fusible disconnect switches, circuit breakers, and fuse trucks. These control devices are inserted into individual cells or compartments within the center to establish mechanical and electrical contact with bus bars, load and line stabs, or similar electrical terminals.

Due to the size and weight of many control devices, they are usually mounted on a support frame with rails or rollers and slid into position. Generally, a mechanical means such as a levering device is required to engage the primary and secondary terminals of the control device to the load lines of the control center. It is also desirable to control the range of movement through various positions such as Connect, Test, Disconnect and Remove positions, to permit operation, removal, change of fuses, servicing, testing, etc. The control device module may include a pair of upstanding cradle arms that define slots that are engaged by levering arms that are attached to the racking mechanism. The levering arms engage the slots in the cradle arms, and rotation thereof causes the control device to be rolled or slid into engagement with the electrical power load lines in the cell of the control center.

This type of racking mechanism and levering device is well known in the art and is available from several manufacturers. For example, the Square D Company produces a line of DS type circuit breakers which operate in accordance with the above description. While the racking mechanism presently available performs well, it is unnecessarily costly and may include many separate parts that are disposed about the circuit device for performing various interlock functions to assure safe installation, operation, removal, and testing. Some of the levering mechanisms of other manufacturers occupy a substantial amount of space in the control device. Thus, other components and features of the control device are prevented from using this area.

Where there are several control devices stacked together or otherwise arranged, the terminals usually remain energized when any one of the individual control devices is being inserted or removed. The exposed terminals pose a safety hazard. An operator could be severely burned or shocked if the terminals were accidentally touched while installing the control device. Therefore, when a control device is inserted, it is desirable to use a lever mechanism which avoids the exposed terminals to prevent inadvertent contact with the energized terminals.

There is a need for a space-saving lever mechanism using an inexpensive, simple assembly which does not interfere with the other components or operation of the control center and the respective control devices. In view of increasing safety requirements for control centers already in operation which may expose energized terminals, there is also a need for a lever mechanism that safely inserts and removes associated control devices and is flexible in adapting to the control center designs of various manufacture.

SUMMARY OF THE INVENTION

In accordance with the present invention, a lever assembly is provided for reversibly inserting a control device into a cell of a center for controlling electrical service. The control center has a post extending perpendicularly into the cell and the control device has a framework of cross-members. The assembly includes a left hand lever, a right hand lever, and a fastener adapted to secure the levers to one of the cross-members and position the levers to engage the post as the device is inserted into the cell. Each lever includes a generally flat elongated shape and a pivot hole positioned towards one end of the lever. The pivot holes are adapted for receiving the fastener therethrough and for allowing rotation of each lever about the fastener. Each lever also includes an open-ended slot extending from one end of the lever towards the pivot hole. The size and position of the open end of the slots are adapted to engage the post in the control center. The length of the open-ended slots are adapted to pull the post therethrough until the control device is fully inserted within the cell. Each lever further includes means for manually rotating the lever about the pivot hole. The rotating means connects to the end of each lever opposite the open end of the slot.

The present invention also contemplates providing a control device for reversibly inserting into a cell of a center for controlling electrical service. The center has a plurality of terminals and a post extending perpendicularly into the cell. The device includes a frame having a plurality of cross-members and a plurality of terminals extending from a rear portion of the device. The terminals are adapted to mate with corresponding terminals extending from the cell of the control center. The device further includes a lever assembly as previously described.

The present invention also provides a center for controlling electrical service with at least one control device. The center includes a partially enclosed framework, at least one cell defined in the framework for receiving the control device, a plurality of terminals extending from a rear portion of the cell and a post connected to the framework and extending perpendicularly into the cell. The center further includes a control device having a lever assembly as previously described.

Accordingly, an object of the present invention is to provide a lever assembly which reversibly provides leverage to insert and remove control devices associated with control centers.

Another object of the invention is to provide a lever assembly which prevents inadvertent contact with exposed terminals in a control center while safely inserting or removing an associated control device.

A further object of the present invention is to provide a lever assembly which easily mounts and saves space in the control device and center.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 3 is an isolated perspective view of the lever assembly shown in FIG. 1 mounted on a cross-member of the control device; and FIG. 4 is a partial perspective view of a control center with several individual cells and an associated control device embodying an alternate embodiment of the inventive lever assembly mounted in an alternate position.

DETAILED DESCRIPTION

Figure 1:
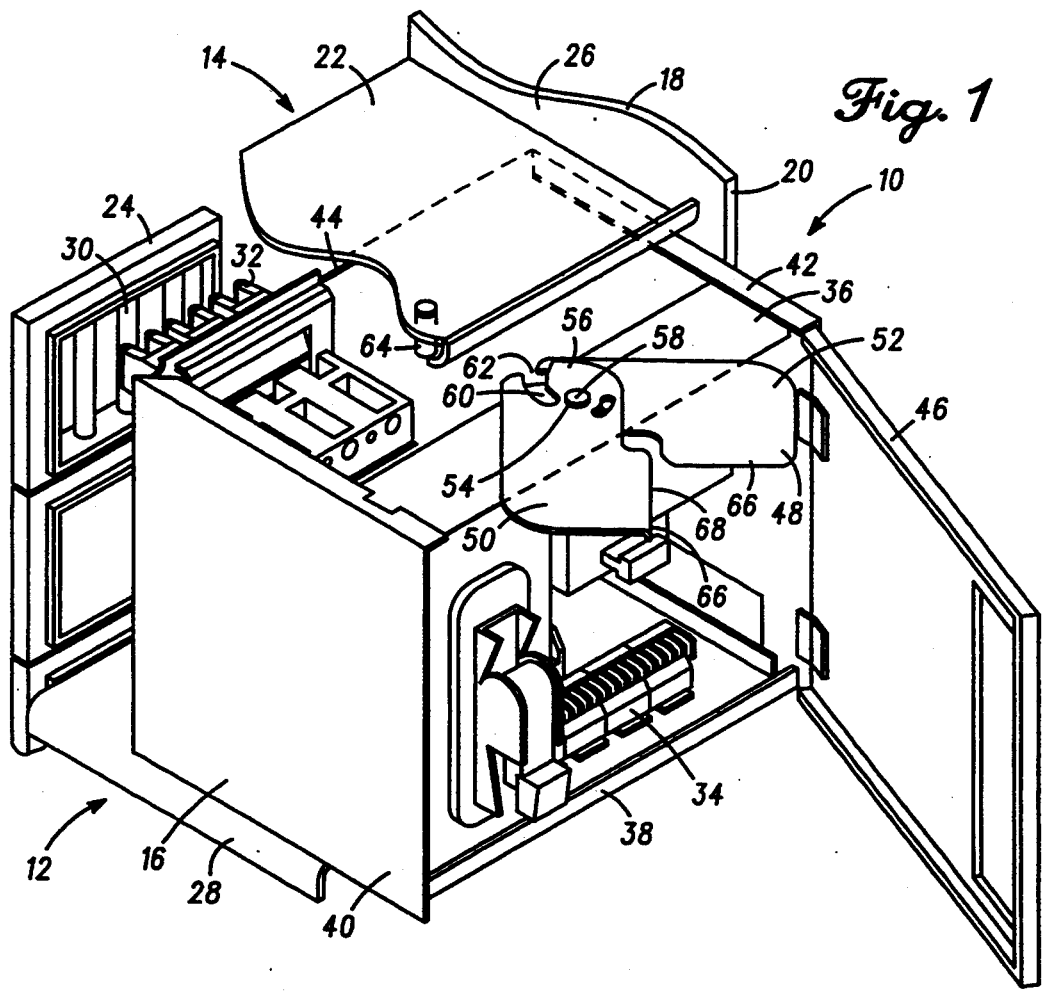
FIG. 1 is a partial perspective view of a control center with several individual cells and an associated control device embodying a lever assembly of the present invention.
Figure 2:
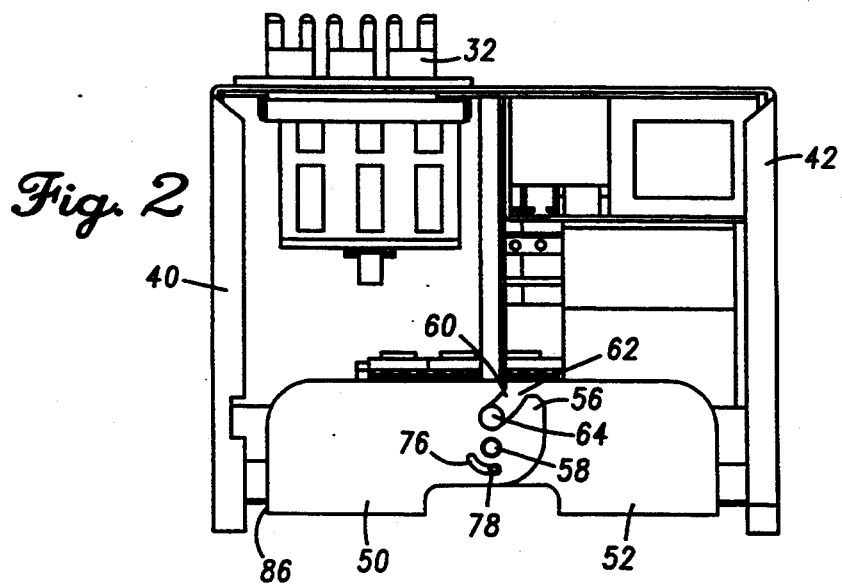
FIG. 2 is a top plan view of a control device with a lever assembly of the present invention in the fully inserted position.

Referring now to FIGS. 1 through 3, there is illustrated a control center 10 embodying the present invention. The control center 10 is defined with a plurality of individual cells 12, 14 which are occupied by different control devices shown typically by reference numeral 16. The control device 16 is removably accommodated in the respective individual cell 12. Control devices like 16 are typically similar in mechanical structure to one another although they may have different dimensions and include different electrical components.

A covered framework, generally designated as 18, partially encloses the control device 16 leaving the front 20 of the framework open to insert the control device 16 therethrough. If the control center 10 is to operate for a long time period without a control device mounted in a particular cell, a cover panel (not shown) is placed over the opening in the front 20 of the framework while it is in operation.

The control center 10 illustrates using the present invention with the cells 12, 14 in a stacked arrangement, although the present invention can be used with other configurations. The stacked configuration of cells 12, 14 in a column can be repeated any number of times with multiple columns of stacked individual cells.

The cells 12, 14 are separated by a barrier like the horizontal shelf 22. Each cell 12 is defined by a rear portion 24, side members like 26, and a bottom member 28 of the framework comprising the control center 10.

Mounted to the rear portion 24 of the framework are electrical terminals 30, in particular, bus bars, for the load and line connections of a multiphase circuit. The terminals 30 are accessible in each cell 12, 14. The terminals 30 are positioned to mechanically and electrically connect with corresponding terminals 32 on the control device 16. The framework 18 typically provides the alignment necessary to complete the connection with the terminals 30 as the control device 16 is inserted into the cell 12.

The control device 16 supports electrical components like 34 within a frame defined by a plurality of cross-members or panels such as top cross-member 36, bottom cross-member 38 and side cross-members 40, 42. The terminals 32 are supported on a rear cross-member 44. A hinged cover 46 is attached to side cross-member 42 to provide access to the interior of the control device 16. Alternately, the cover 46 can be attached to the front 20 of the framework.

When the control device 16 is inserted or removed from the individual cell 12, the terminals 30 and 32 are respectively engaged or disengaged. Typically, the terminals 32 are convention contact jaws or stabs. To provide the force needed to make the mechanical and electrical connection between the terminals 30 and 32, a preferred embodiment of the inventive lever assembly 48 is mounted to the top cross-member 36. The assembly 48 is provided in a superposed relation over the top cross-member 36.

The assembly 48 includes a left hand lever 50 and a right hand lever 52. The levers 50, 52 have a generally flat elongated shape. Each lever like 50 has a pivot hole 54 positioned towards one end 56 of the lever. The size of the pivot holes 54 correspond to receive a fastener 58 therethrough. The fastener 58 attaches the levers 50 and 52 to the top cross-member 36. The levers 50 and 52 rotate freely about the fastener 58. Any conventional fastener such as a bolt, screw or rivet, for example, is suitable for use with the present invention.

Each lever like 50 has an open-ended slot 60 extending from one end 56 of the lever towards the pivot hole 54. Each slot has an open end 62 sized and positioned to engage a post 64 affixed to the shelf 22 of the control center. The post 64 extends perpendicularly from the shelf 22 into the interior of the cell 12 near the front 20 of the framework. The length of the open-ended slots 60 are predetermined to pull the post 64 therethrough until the device 16 is fully inserted in the cell 12 and the terminals 30 and 32 are engaged.

Preferably, the open-ended slots 60 in levers 50 and 52 are the mirror image of each other to provide for the smooth and continuous exertion of leverage on the post 64. Furthermore, the open-ended slots 60 are preferably curved. The prevent invention, however, contemplates other shapes for the open-ended slots. For example, the shape of the open-ended slots 60 can be straight.

Each lever like 50 has a flange 66 upstanding along edge 68 of the lever opposite the open end 62 of the slot and across from the pivot hole 54. The size of the flanges 66 are pre-determined to provide a grip for the fingers and hands of the operator so that the levers 50 and 52 can be manually pulled or pushed to rotate about the fastener 58 in the pivot holes 54.

The present invention contemplates other means for manually rotating the levers 50 and 52 about the pivot holes 54. For example and not for limitation, different types of handles can be connected to the edge 68 of each lever. One factor in determining the exact size and position of the handles is the clearance provided between the device 16 and the framework 18 of the control center.

Referring specifically to FIG. 3, the preferred embodiment of the assembly 48 includes a spacer 70 having a flat elongated shape substantially smaller than the levers 50 and 52. The spacer 70 has a centrally located spacer hole 72 to accommodate the fastener 58 therethrough. The spacer 70 is positioned between the top cross-member 36 and the lever 52 which is illustrated beneath lever 50. The spacer 70 eliminates friction that would otherwise be generated by the contact between the bottom surface of the lever 52 and top surface 74 of the top cross-member.

The present invention contemplates using other shapes for the spacer 70. For example, a washer-like shape can be used.

In the preferred embodiment, each lever like 50 includes a guide slot 76 positioned near the pivot hole 54 along its circumference and opposite the open-ended slot 60. The shape of the guide slots 76 are bowed to generally follow the circumference of the pivot holes 54. The spacer 70 includes a stop tab 78 upstanding therefrom. The stop tab 78 is positioned to extend through the guide slot 76 of each lever 50, 52. The length of each guide slot 76 is predetermined to engage the stop tab 78 at both ends of the guide slots like 76 to limit the range of rotation of the levers 50, 52. To fix the position of the stop tab 78, the spacer 70 includes spacer flanges 80 which extend downwardly from edge 82 of the spacer. The spacer flanges 80 are positioned to abut the top surface 74 and edge 84 of the top cross-member so that the spacer 70 and, consequently, the stop tab 78 does not rotate with the levers 50, 52.

To operate the present invention, FIGS. 1 and 3 illustrate the assembly 48 in the open position as the device 16 is inserted into the cell 12. As the device 16 slides towards the rear portion 24 of the framework, the open end 62 of the slot on each lever 50, 52 engages the post 64. Simultaneously, the terminals 30 and 32 begin to engage each other. In order to apply the additional force necessary to complete the mechanical and electrical engagement between the terminals 30 and 32, the operator manually pushes on flanges 66 with approximately equal pressure.

The pressure applied to the flanges 66 draws the post 64 through the open-ended slots 60 and pulls the device 16 further into the cell 12 to complete the connection between the terminals 30 and 32. The length of the open-ended slots 60 must be sufficiently long to allow the device 16 to fully insert into the cell 12 and complete the connection between the terminals 30 and 32.

FIG. 2 illustrates the position of the post 64 within the open-ended slots 60 when the device 16 is fully inserted and the terminals 30 and 32 are engaged. Preferably, the levers 50 and 52 are juxtaposed with the top cross-member 36 leaving a small, finger-sized gap 86 between the flanges 66 and the top cross-member 36. This eliminates any interference between the levers 50, 52 and closing the cover 46.

One of the advantages of the present invention is that the leverage supplied by the assembly 48 is fully reversible when removing the device 16 from the cell 12. The operator places their fingers in the gap 86 to pull on the flanges 66 from behind. As pressure is applied, the levers 50 and 52 counter-rotate about the fastener 58 in their respective pivot holes 54. The post 64 is pushed towards the open ends 62 of the slots. As a result, the device 16 is pushed out of the cell 12 and the connection between the terminals 30 and 32 is broken.

As the post 64 begins to clear the open ends 62 of the slots, the stop tab 78 engages the end of the guide slots 76 and prevents further rotation by the levers 50, 52. At this point, the terminals 30 and 32 have been completely disengaged and the device 16 is easier to slide. The withdrawal of the device 16 from the cell 12 is then finished by manually grasping the front and sides of the device 16.

Turning now to FIG. 4, another embodiment of the present invention is illustrated. A control center 110 is defined with a plurality of individual cells 112, 114 which can be occupied by different control devices shown typically by reference numeral 116. The control device 116 is removably accommodated in the respective individual cell 112.

A covered framework, generally designated as 118, partially encloses each control device leaving the front 120 of the framework open to insert the control device 116 therethrough. Each cell like 112 is partially defined by a side member 126 and a rear portion 124.

The control device 116 includes a frame defined by a plurality of cross-members or panels such as top cross-member 136, bottom cross-member 138 and side cross-members 140, 142. A plurality of terminals 132 are supported on a rear cross-member 144 and correspond to terminals provided in the rear portion 124 of the framework in each cell 112.

A lever assembly 148 is provided in a superposed relation over the side cross-member 140. The assembly includes a right hand lever 150 and a left hand lever 152. Each lever like 150 has a pivot hole 154 positioned towards one end 156 of the lever. The size of the pivot holes 154 correspond to receive a fastener 158 therethrough. The fastener 158 attaches the levers 150 and 152 to the side cross-member 140. The levers 150 and 152 rotate freely about the fastener 158.

Each lever like 150 has an open-ended slot 160 extending from one end 156 of the lever towards the pivot hole 154. The open end 162 of the each slot is sized and positioned to engage a post 164 affixed to the side portion 126 of the control center. The post 164 extends perpendicularly from the side member 126 into the interior of the cell 112 near the front 120 of the framework.

Each lever like 150 has a flange 166 upstanding along edge 168 of the lever opposite the open end 162 of the slot and across from the pivot hole 154. The size of the flanges 166 are pre-determined to provide a grip for the fingers and hands of the operator so that levers 150 and 152 can be manually pulled or pushed to rotate about the fastener 158 in the pivot holes 154.

FIG. 4 clearly illustrates the flexibility provided by the present invention in positioning the lever assembly 148. It is desireable to align the assembly 148 in close proximity to the terminals 132 to deliver the leverage between the post 164 and levers 150, 152 along a line approximately perpendicular to the terminals 132. Thus, the possibility of the device 116 racking or twisting in the cell 112 is minimized as the terminals 132 are engaged.

Another feature illustrated by this alternate embodiment is that only one lever 152 includes a guide slot 176 positioned near the pivot hole 154 along its circumference opposite the open-ended slot 160. The shape of the guide slot 176 is bowed to generally follow the circumference of the pivot hole 154. The other lever 150 includes a stop tab 178 upstanding therefrom. The stop tab 178 is positioned to extend through the guide slot 176 of lever 152. The length of the guide slot 176 is predetermined to engage the stop tab 178 at both ends of the guide slot 176 to limit the range of rotation of the levers 150, 152.

FIG. 4 also illustrates the use of the present invention without a spacer and that the flanges 166 can be pushed to a position flush with edge 184 of the side portion 140. In this embodiment, it is important that the flanges 166 are substantially longer than the thickness of the side portion 140 so as to provide a finger grip on the backside of the flanges 166.

Although this embodiment does not have the attendant advantages of the lever assembly 48 previously described, the particular design of the control device or control center may necessitate this approach.

Preferably, the lever assemblies 48, 148 are made of an electrostatically painted metal. It is also suitable to use metal with an insulating coating or a thermoplastic material of sufficient structural strength.

The present invention is specifically disclosed for use with control centers manufactured by the Square D Company under the catalog designation OmegaPak (registered trademark of the Square D Company) and others. Motor controls like the Model 6 units and the Model 5 units (registered trademarks of the Square D Company) and other power output units are a type of the control devices referred to herein. In particular, the preferred embodiment is used as either an original equipment or aftermarket attachment with the Model 6 units. These control units are used in control centers which have been in the marketplace for years and have been continually updated.

As those skilled in the art will appreciate, the inventive lever assembly can be adapted and configured for usage with a wide variety of control centers. It will be further understood that whereas the term control centers is defined to include, but not be limited to, motor control centers and switchgear. Likewise, the term control devices is defined to include motor controls and other types of control units like circuit breakers, switches, fuses, and combinations thereof.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A lever assembly for reversibly inserting a control device into a cell of a center for controlling electrical service, the center having a post extending perpendicularly into the cell and the control device having a frame of cross-members, the assembly comprising:
   a left hand lever;
   a right hand lever; and
   a fastener securing the levers to one of the cross-members such that the levers engage the post as the device is inserted in the cell;
   each lever includes:
      a generally flat elongated shape,
      a pivot hole positioned towards one end of each lever, the pivot hole receiving the fastener therethrough and each lever rotatable about the fastener,
      an open-ended slot extending from one end of each lever towards the pivot hole, the slot engaging the post in the control center simultaneously and from an opposed direction with the slot of the other lever, the length of the open-ended slot being adapted to pull the post therethrough until the control device is fully inserted within the cell, and
      means for manually rotating each lever about the pivot hole, the rotating means connecting to the end of each lever opposite the open end of the slot.

2. The assembly of claim 1 wherein the assembly further includes a spacer having a flat elongated shape substantially smaller than the size of the levers, the spacer having a centrally located spacer hole receiving the fastener therethrough, the spacer being positioned between the cross-member of the control device and the levers so that friction generated by contact between the cross-member and the levers is minimized.

3. The assembly of claim 2 wherein each lever further includes a guide slot positioned near the pivot hole along a portion of the circumference thereof opposite the open-ended slot, the spacer having a stop tab upstanding therefrom, the stop tab extending through the guide slot in each lever, the length of each guide slot being pre-determined to engage the stop tab and limit the rotation of the levers, the spacer also having a spacer flange extending downwardly from one edge thereof, the spacer flange abutting one edge of the cross-member to prevent the spacer from rotating with the levers.

4. The assembly of claim 1 wherein one level further includes a guide slot being positioned near the pivot hole along a portion of the circumference thereof opposite the open-ended slot, the other lever further includes a stop tab upstanding therefrom, the stop tab being positioned to extend through the guide slot, the length of the guide slot being pre-determined to engage the stop tab and limit the rotation of the levers.

5. The assembly of claim 1 wherein each open-ended slot is curved and is the mirror-image of the other.

6. The assembly of claim 1 wherein the rotating means further includes a flange upstanding along one edge of each lever opposite the open end of the slot, the size of the flanges being sufficient to provide a finger-grip.

7. The assembly of claim 2 wherein the rotating means further includes juxtaposing the levers with the cross-member with the control device is fully inserted in the cell.

8. A control device for reversibly inserting into a cell of a center for controlling electrical service, the center having a plurality of terminals and a post extending perpendicularly into the cell, the device comprising:
   a frame having a plurality of cross-members;
   a plurality of terminals extending from a rear portion of the device, the terminals adapted to mate with corresponding terminals extending from the cell of the control center;
   a lever assembly including:
      a left hand lever;
      a right hand lever; and
      a fastener securing the levers to one of the cross-members such that the levers engage the post as the device is inserted in the cell;
   each lever includes:
      a generally flat elongated shape,
      a pivot hole positioned towards one end of each lever, the pivot hole receiving the fastener therethrough and each lever rotatable about the fastener,
      an open-ended slot extending from one end of each lever towards the pivot hole, the slot engaging the post in the control center simultaneously and from an opposed direction from the slot of the other lever, the length of the open-ended slot being adapted to pull the post therethrough until the control device is fully inserted within the cell, and
      means for manually rotating each lever about the pivot hole, the rotating means connecting to the end of each lever opposite the open end of the slot.

9. The control device of claim 8 wherein the lever assembly further includes a spacer having a flat elongated shape substantially smaller than the size of the levers, the spacer having a centrally located spacer hole receiving the fastener therethrough, the spacer being positioned between the cross-member of the control device and the levers so that friction generated by contact between the cross-member and the levers is minimized.

10. The control device of claim 9 wherein each lever further includes a guide slot positioned near the pivot hole along a portion of the circumference thereof opposite the open-ended slot, the spacer having a stop tab upstanding therefrom, the stop tab extending through the guide slot in each lever, the length of each guide slot being pre-determined to engage the stop tab and limit the rotation of the levers, the spacer also having a spacer flange extending downwardly from one edge thereof, the spacer flange abutting one edge of the cross-member to prevent the spacer from rotating with the levers.

11. The control device of claim 8 wherein the rotating means further includes a flange upstanding along one edge of each lever opposite the open end of the slot, the size of the flanges being sufficient to provide a finger-grip.

12. A center for controlling electrical service with at least one control device the center comprising:
   a partially enclosed framework;
   at least one cell defined in the framework for receiving the control device;
   a plurality of terminals extending from a rear portion of the cell;
   a post connected to the framework and extending perpendicularly into the cell;
   a control device including a frame having a plurality of cross-members and a plurality of terminals extending from the rear portion of the device in a corresponding position to mate with the cell terminals; and
   a lever assembly including:
   a left hand lever;
   a right hand lever; and
   a fastener securing the levers to one of the cross-members such that the levers engage the post as the device is inserted in the cell;
   each lever includes:
   a generally flat elongated shape,
   a pivot hole positioned towards one end of each lever, the pivot hole receiving the fastener therethrough and each lever rotatable about the fastener,
   an open-ended slot extending from one end of each lever towards the pivot hole, the slot engaging the post in the control center simultaneously and from an opposed direction from the slot of the other lever, the length of the open-ended slot being adapted to pull the post therethrough until the control device is fully inserted within the cell, and
   means for manually rotating each lever about the pivot hole, the rotating means connecting to the end of each lever opposite the open end of the slot.

13. The control center of claim 12 wherein the lever assembly further includes a spacer having a flat elongated shape substantially smaller than the size of the levers, the spacer having a centrally located spacer hole receiving the fastener therethrough, the spacer being positioned between the cross-member of the control device and the levers so that friction generated by contact between the cross-member and the levers is minimized.

14. The control center of claim 13 wherein each lever further includes a guide slot positioned near the pivot hole along a portion of the circumference thereof opposite the open-ended slot, the spacer having a stop tab upstanding therefrom, the stop tab extending through the guide slot in each lever, the length of each guide slot being pre-determined to engage the stop tab and limit the rotation of the levers, the spacer also having a spacer flange extending downwardly from one edge thereof, the spacer flange abutting one edge of the cross-member to prevent the spacer from rotating with the levers.

15. The control center of claim 12 wherein the rotating means further includes a flange upstanding along one edge of each lever opposite the open end of the slot, the size of the flanges being sufficient to provide a finger-grip.

16. The control center of claim 12 wherein the post and the levers are aligned on the cross-member to provide leverage in a direction perpendicular to the cell and device terminals.

* * * * *